United States Patent [19]

Turk et al.

[11] 4,236,883
[45] Dec. 2, 1980

[54] TIRE PRESS

[75] Inventors: Leonard G. Turk, Akron; George E. Enders, Salem, both of Ohio

[73] Assignee: NRM Corporation, Akron, Ohio

[21] Appl. No.: 54,869

[22] Filed: Jul. 5, 1979

[51] Int. Cl.² .............................................. B29H 5/02
[52] U.S. Cl. ........................................ 425/32; 425/36; 425/44; 425/38; 425/58; 264/501; 264/334
[58] Field of Search .................... 425/32, 33, 35, 36, 425/38, 58, 44, 393, 28 P; 249/180, 181; 264/334, 501

[56] References Cited

U.S. PATENT DOCUMENTS

| | | | |
|---|---|---|---|
| 814,304 | 3/1906 | Landmann | 249/81 X |
| 1,307,283 | 6/1919 | Webb | 249/180 |
| 2,812,544 | 11/1957 | Soderquist | 425/32 |
| 2,812,545 | 11/1957 | Soderquist | 425/32 |
| 2,812,546 | 11/1957 | Soderquist | 425/32 |
| 2,904,832 | 9/1959 | Frohlich et al. | 425/32 |
| 2,904,833 | 9/1959 | Frohlich et al. | 425/32 |
| 2,913,765 | 11/1959 | Frohlich et al. | 425/32 |
| 2,921,337 | 1/1960 | Frohlich et al. | 425/32 |
| 2,959,815 | 11/1960 | Brundage | 425/32 |
| 2,997,740 | 8/1961 | Soderquist | 425/32 |
| 3,012,277 | 12/1961 | Soderquist | 425/32 |
| 3,097,394 | 7/1963 | Mallory et al. | 425/38 X |
| 3,153,263 | 10/1964 | Mallory et al. | 425/32 |
| 3,205,535 | 9/1965 | Niessner et al. | 425/393 X |
| 3,339,242 | 9/1967 | Lamb | 249/180 X |
| 3,378,882 | 4/1968 | Turk et al. | 425/38 |
| 3,506,748 | 4/1970 | Cardenas et al. | 425/32 X |
| 3,530,533 | 9/1970 | Turk et al. | 425/32 |
| 3,541,643 | 11/1970 | Soderquist | 425/32 |
| 3,584,335 | 6/1971 | Ulm et al. | 425/36 |
| 3,659,975 | 5/1972 | Leblond | 425/36 |
| 3,677,684 | 7/1972 | Platz | 425/393 |
| 3,732,054 | 5/1973 | Lyng | 425/393 |
| 3,917,791 | 1/1975 | Kratochvil et al. | 425/32 X |
| 3,966,385 | 6/1976 | Spears | 249/180 X |
| 4,045,150 | 8/1977 | Gazuit | 425/38 X |
| 4,068,989 | 1/1978 | Cantarutti | 425/38 |
| 4,092,090 | 5/1978 | Yuhas et al. | 425/28 P |

*Primary Examiner*—J. Howard Flint, Jr.
*Attorney, Agent, or Firm*—Maky, Renner, Otto & Boisselle

[57] ABSTRACT

A tire curing press and method are characterized by a center mechanism operative first to center the top bead of a green tire carcass with respect to the top mold section and then the bottom bead with respect to the bottom mold section, and to hold the beads centered and axially separated as the press closes to cause the beads to register and seat with the toe rings of the top and bottom mold sections simultaneously as the press closely approaches its closed condition. The center mechanism comprises top and bottom segmented annular clamping rings adapted to engage and shape the axial interior of the bead area of the tire and respective chuck assemblies including a multi-faceted linear cam and respective followers for each ring segment operative to collapse each alternate ring segment and then each other ring segment. The clamping rings achieve automatic loading, centering and unloading and may be used individually or paired in bladder or bladderless curing.

50 Claims, 19 Drawing Figures

TIRE PRESS

FIELD OF THE INVENTION

This invention relates generally to a tire curing press more particularly to a curing press center mechanism therefor.

BACKGROUND OF THE INVENTION

Bladderless curing presses and methods, and the advantages thereof over bladder-type curing presses, are well known to those skilled in the tire art. Such bladderless presses, for example, do not require the expensive bladders which are subject to wear and require replacement resulting in added downtime of the press. The bladders are also subject to failure which may go undetected resulting in poor quality or defective tires. It is also known that bladderless curing can substantially reduce cure time resulting in increased productivity. Examples of known bladderless curing presses are shown and described, for example, in Mallory et al U.S. Pat. No. 3,153,263, Brundage U.S. Pat. No. 2,959,815, Soderquist U.S. Pat. Nos. 2,812,544–546 and Frohlich et al U.S. Pat. No. 2,904,833.

Even with these many known advantages over curing methods and presses employing bladders, bladderless curing has not achieved great popularity in the industry. One of the major drawbacks of known bladderless curing presses is that effective automatic loading and unloading techniques and machinery therefor have not been developed. The reduction in curing time is often more than offset by the additional time and manual labor required for proper loading and unloading of the press. Moreover, manual placement of the green tire carcass in the mold cavity does not always insure proper centering of the same in the press which may lead to poor quality or defective tires. Another drawback of known bladderless curing presses and methods has been their inability to provide effectively and efficiently for extraction from the cured tire of internal curing media such as steam condensate or water at the end of the cure cycle.

Even in bladder type presses, the loading centering shaping and unloading of the tire presents a problem. In Turk et al U.S. Pat. No. 3,378,882, the tire is picked up by the top bead by a chuck in the top mold section and is seated on the top toe ring before the press head is translated to bring the bottom bead adjacent the bottom toe ring for bladder insertion. While such center mechanism is useful, the seating of one bead before the other can result in uneven bead curing and the large extent of press opening and movement is energy inefficient.

OBJECTS OF THE INVENTION

It is accordingly a principal object of this invention to provide an improved tire curing press which may achieve many of the advantages of bladderless curing presses while overcoming many of the drawbacks or limitations thereof to the achievement of greater acceptance of such type of presses by the industry.

It is another important object of this invention to provide for effective loading and unloading of tires in a tire curing press.

It is still another object of this invention to provide such tire curing press wherein the beads of a green tire carcass are mechanically centered during loading to their respective mold sections.

It is yet another object of this invention to provide such a press wherein the beads of the green tire carcass are maintained centered and axially separated as the press closes to cause the beads simultaneously to register with the toe rings of the mold sections only at the desired point in the closing cycle.

It is a further object of this invention to provide such a press wherein the beads of the green tire carcass are fully seated prior to final closing of the press.

It is still a further object of this invention to provide for effective and efficient extraction of cure media from the tire during unloading of same from the press.

It is yet a further object of this invention to provide a curing press having a collapsible bead clamping ring and chuck assembly of relatively few moving parts in comparison to known ring and chuck assemblies.

A further important object is the provision of a tire press wherein the extent and duration of the open portion of the cycle of the press may be greatly foreshortened, thus conserving both time and energy.

SUMMARY OF THE INVENTION

To the achievement of the noted objects, and other objects which will become apparent from the following description, the tire curing press according to this invention is characterized by a center mechanism operative first to center the top bead of a green tire carcass with respect to the top mold section of the press and then the bottom bead with respect to the bottom mold section, and to hold the beads centered and axially separated as the press closes to cause the beads to register with the bead rings of the top and bottom mold sections simultaneously at the desired point in the closing cycle. The center mechanism comprises top and bottom segmented annular clamping rings adapted to engage the axial interior of the bead area of a tire, and respective chuck assemblies each including a multifaceted linear cam and respective followers for each ring segment operative to collapse each alternate ring segment and then each other segment.

According to another aspect of the invention, retractable bead centering members carried by each chuck assembly are operative mechanically to self-center a tire on the annular clamping ring to insure proper seating of the tire beads against their respective toe rings as the mold sections close.

In accordance with the invention, the top bead clamping ring, when positioned interiorly of a green tire carcass at a loading position, is expanded to engage the top bead thereof and to center the same to the top mold section. The bottom bead clamping ring is then expanded to engage the bottom tire bead and to center the same relative to the bottom mold section. The top and bottom center mechanisms will maintain the beads centered to their respective mold sections as the press closes and will provide for simultaneous engagement of the beads wth their respective toe rings as the mold sections simultaneously close. As the beads are brought into engagement with the toe rings, the annular clamping rings will shape and compress the bead to a desired shape and hold the same effecting a tight seal for curing media in the center of the tire. After cure, the chuck assemblies and clamping rings are operable to drain the cured tire and to unload the press while maintaining proper centering and control of the tire for accurate placement of the cured tire in an unloader for the press or into a post cure inflator. By partial collapse of one set of alternate ring segments of the bottom clamping ring and by increasing the axial spacing between top and bottom chuck assemblies, the cured tire may be sufficiently slightly distorted whereby condensate is drained intermediately the uncollapsed ring segments. The bottom clamping ring is then fully collapsed and the top chuck assembly carries the cured tire for unloading purposes.

To the accomplishment of the foregoing and related ends, the invention then comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DESCRIPTION OF THE PREFERRED EMBODIMENTS

General Construction Of The Press

Figure 8:
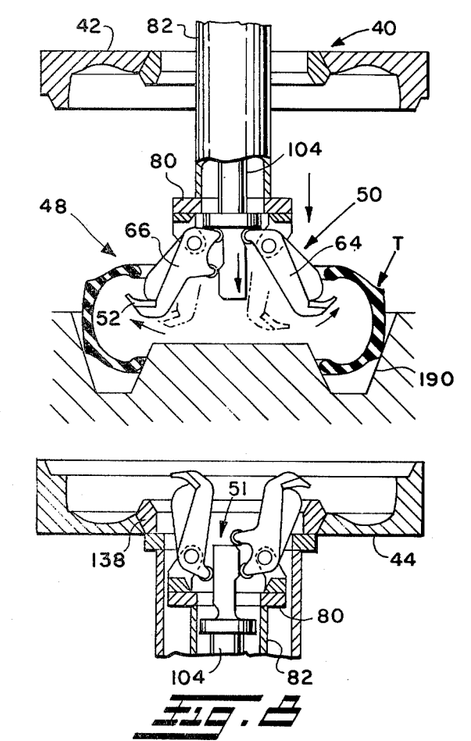
FIGS. 8-19 are sequential schematic illustrations showing an exemplary sequence of operations of the curing press.

Referring now to the drawings, and initially to FIG. 8, portions of a tire curing press 40 are shown with the same being in a fully opened position for receipt of an uncured tire carcass such as radial tire carcass T. The press 40 includes top and bottom mold sections 42 and 44 which when closed in mating engagement form a mold cavity of tire shape for the tire T. The top mold section 42 is normally carried by a movable press head (not shown) while the bottom mold section 44 is normally mounted on a press base (not shown). Examples of tire curing presses with which the principles of the invention may be employed are shown and described in greater detail in U.S. Pat. No. 2,959,815 to Brundage and U.S. Pat. No. 3,153,263 to Mallory et al, and the same may be consulted for a more complete description of curing presses and their operation. It should be understood, however, that such patents are referred to merely to facilitate an understanding of the invention and not for purposes of limiting same to only such type of presses disclosed therein as those skilled in the art will readily appreciate that the principles of the invention may be employed with many different types of presses.

Although the press may be of the "slideback" or "tiltback" type wherein the press head moves laterally after vertically opening, it will be seen that a straight up and down press of the type seen in the aforementioned Brundage U.S. Pat. No. 2,959,815 is preferred with the vertical motion being only enough to load and remove the tire. The press shown in FIG. 8 is open to its fullest extent and for many if not most tires it would not need to open to the extent shown.

In accordance with the invention, the press 40 comprises a center mechanism 48 operable to engage the beads of tire T and to center the same to the mold sections during loading and unloading of the tire. The center mechanism includes a top bead clamping ring and chuck assembly 50 which is carried by the press head for movement therewith and is adapted to center, shape and clamp the upper bead of tire T to the top mold section 42. An identical, but reversely positioned, bottom bead clamping ring and chuck assembly 51 is mounted in the press base for relative vertical movement and is adapted to center, shape and clamp the lower bead of tire T to the bottom mold section 44. The top and bottom bead clamping ring and chuck assemblies are identical in construction, and only the top assembly 50 will be described below in detail, it being understood that such description will be equally applicable to the bottom assembly 51 except that orientation will be reversed.

The Bead Clamping Ring And Chuck Assemblies

Figure 1:
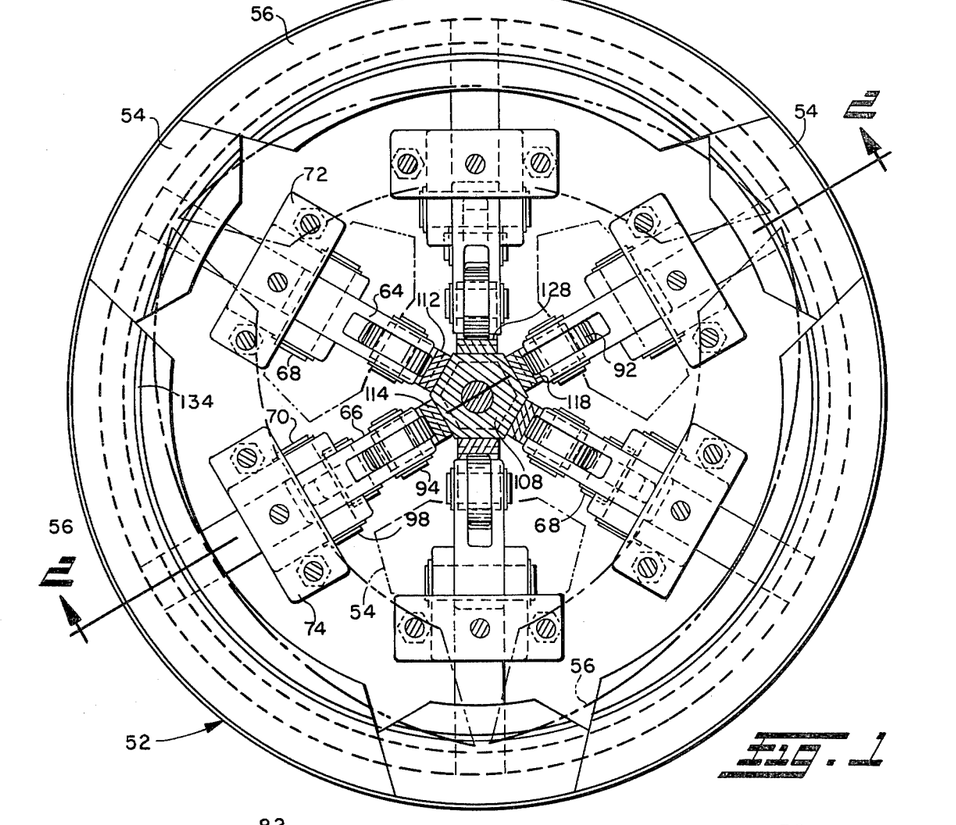
FIG. 1 is a horizontal section as seen from the line 1—1 of FIG. 2 of the upper chuck assembly of a tire curing press center mechanism constructed in accordance with the present invention, the clamping ring of such assembly being shown in solid lines in an expanded state and in phantom lines in a collapsed state for permitting free entry into the interior of a tire.
Figure 2:
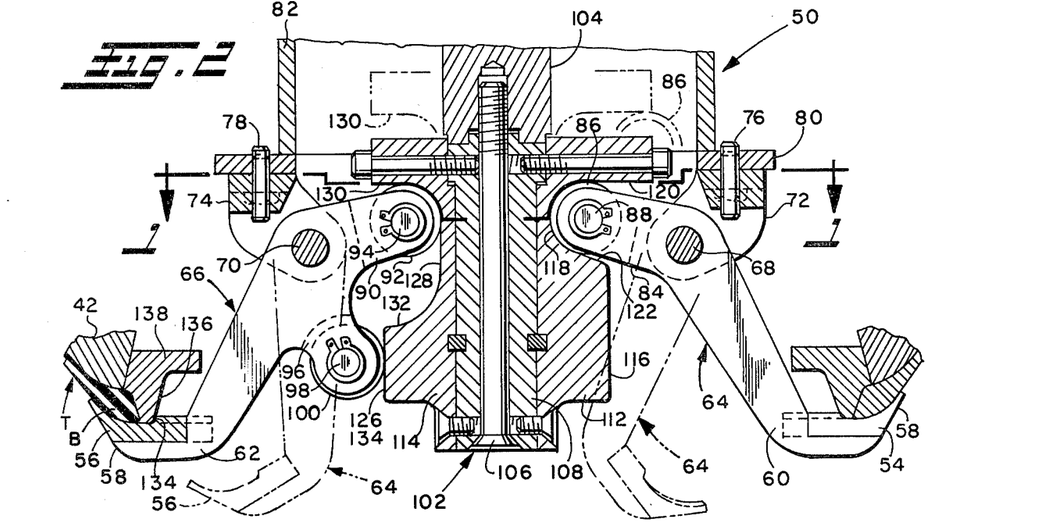
FIG. 2 is a vertical section of the chuck assembly of FIG. 1 taken substantially along the line 2—2 thereof.

Referring now to FIGS. 1 and 2, the bead clamping ring and chuck assembly 50 includes a collapsible bead shaping and clamping ring 52 made up of alternate short and long arcuate segments 54 and 56, respectively. Six such arcuate segments are shown and together, when expanded, form the continuous ring 52 with their beveled ends juxtaposed as shown in solid lines in FIGS. 1 and 2. The arcuate segments, however, are radially collapsible to the phantom line position shown. In such collapsed state, the collapsed ring segments are of a greatest diameter less than the inner bead diameter of tire T whereby the same may be inserted into the interior of tire T and then expanded radially outwardly into engagement with the axial interior of the bead of tire T in a manner more fully described below. To facilitate insertion of the collapsed rings into the tire T, the ring segments may have tapered undersides 58 which together constitute a conical pilot surface to assist in centering the tire to the collapsed ring as same enters the interior of the tire.

In order to impart desired radial and axial movement to the arcuate segments for collapsing and expanding the same, such segments 54 and 56, respectively, are integrally formed with or connected to the distal ends of lower, radially outer legs 60 and 62 of alternately circumferentially arranged bell cranks 64 and 66. The bell cranks 64 and 66 are secured to respective pins 68 and 70 for pivotal movement about the pivots provided thereby. The pins 68 and 70 may be mounted, respectively, in depending clevises 72 and 74 which are secured by fasteners 76 and 78 to the underside of annular radial flange 80 of an axially vertically movable cylinder 82. The cylinder 82 is carried on the press head coaxially with the top mold section 42 and is provided with a suitable actuator such as a piston-cylinder assembly (not shown) for effecting such axial vertical movement of the ring and chuck assembly 50 relative to the top mold section 42 to axially extend and retract the assembly 50.

The upper, radially inner leg 84 of each bell crank 64 (corresponding to a short segment 54) terminates in a U-shape portion forming an axially vertically extending slot in which a roller 86 is rotatably mounted by horizontal pin 88. The upper radially inner leg 90 of each other and alternately arranged bell crank 66 (corresponding to a long segment 56) is similarly formed with a vertical slot in which a roller 92 is rotatably mounted by horizontal pin 94. Each bell crank 66 is also formed with a second radially inner leg 96 which also terminates in a U-shape portion in which is rotatably mounted by horizontal pin 98 a roller 100. The second radially inner leg 96 may radiate from pivot 70 substantially at a right angle to upper, radially inner leg 90. The roller or rollers of each bell crank serve as cam followers and coact with a multi-faceted linear cam assembly 102 for controlled actuation of the arcuate ring segments 54 and 56.

Figure 6:
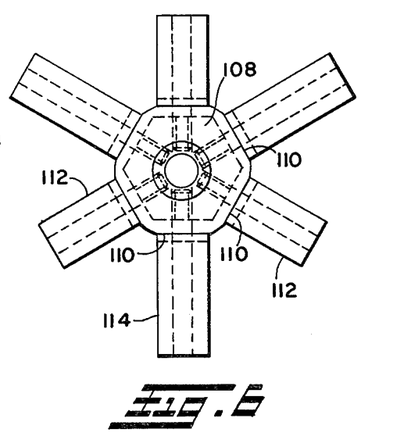
FIG. 6 is a top plan similar to that of FIG. 1 with various elements removed to illustrate more clearly the relationship of the chuck assembly linear cam blocks to one another.

The cam assembly 102 includes an actuator rod 104 which is mounted on the press head coaxially with the cylinder 82 and is provided with a suitable actuator such as a piston-cylinder assembly (not shown) for effecting vertical axial movement thereof relative to the cylinder 82. Secured at the distal end of the rod 104 by screw fastener 106 is rod end 108. As best seen in FIG. 6, the rod end is hexagonal in transverse cross-section having six vertical faces 110 at which are secured to the rod end in alternating arrangement cam blocks 112 and 114 corresponding to bell cranks 64 and 66, respectively. The cam blocks 112 and 114 radiate outwardly from the rod end and are circumferentially equally spaced like spokes of a wheel.

Each cam block 112 (corresponding to a short segment 54) has an axially extending radially outer planar cam face 116 which is recessed at its axially upper end at 118. The recess 118 is sized to accommodate the roller 86 when the short ring segments 54 are radially extended. The recess 118 is bounded at its upper end by radially extended top shoulder 120 and at its lower end by a bottom shoulder 122 which extends predominantly radially and slightly axially downwardly to the cam face 116. The opposed top and bottom shoulders 120 and 122 are spaced to control positively the pivotal movement of each bell crank 64.

As best seen in FIG. 2, moving the actuator rod 104 axially upwardly from the position shown in solid lines will cause the bottom shoulder 112 immediately to bear against the roller 86 thus pivoting the bell crank 64 clockwise to swing each short ring segment 52 radially inwardly and initially axially downwardly. As the actuator rod continues its upward axial vertical movement, the roller 86 will be urged out of recess 118 by the bottom shoulder 122 and then will ride along cam face 106 to maintain each short ring segment 54 in its fully collapsed state as shown in phantom lines. To extend the short ring segments 54, the actuator rod 104 is axially lowered from its fully retracted position, and as the rollers 86 engage top shoulders 120, the bell cranks 64 will be caused to pivot counterclockwise thereby to swing the ring segments 54 radially outwardly and axially upwardly through an arcuate path to form with the long segments 56 the annular ring 52.

Each cam block 114 (corresponding to a long arcuate segment 66) is also formed with an axially extending planar cam face 126 and a recess 128 at its upper end. However, the radially extended top shoulder 130 and bottom shoulder 132 bounding the recess 128 are spaced apart to permit initial axial upward movement of actuator rod 104 before the roller 92 of bell crank 66 bears against the bottom shoulder 132 causing counterclockwise pivoting of each bell crank 66. Further, the cam face 126 terminates at its lower end at a radially inwardly extending lower shoulder 134. The lower shoulder 134 is spaced from bottom shoulder 132 so that when the roller 92 bears against the bottom shoulder 132, the roller 100 previously riding along cam face 126 can clear the cam face 126 and can move radially inwardly to allow the bell crank 66 to pivot and thus collapse each long ring segment 56 to a retracted position shown in phantom lines in FIGS. 1 and 2.

With the foregoing construction, as the actuator rod 104 moves upwardly initially from the solid line position shown in FIG. 1, first the rollers 86 will bear against the bottom shoulders 122 of cam blocks 112 thereby causing bell cranks 64 to pivot and thus collapse first the short ring segments 54. During such initial movement, the long segments 56 will be maintained in their extended solid line position as the rollers 100 will bear against cam faces 126 to prevent pivoting of the bell cranks 66. After the short segments 54 are sufficiently clear of the long segments 56 to allow collapse thereof, the rollers 92 will engage bottom shoulders 132 thereby causing the bell cranks 66 to pivot and thus collapse the long ring segments 56. It should be appreciated that the short ring segments 54 are swung through a greater arc than the long ring segments 56 so that the same are positioned radially inwardly of the long segments 56 when both are fully collapsed to prevent any interference therebetween. To expand the segments, the rod 104 is lowered causing first the bottom shoulders 134 of cam blocks 114 to bear against rollers 100 to cause pivoting of bell cranks 66 to swing first the long segments 56 to their expanded state. During such initial downward movement, the short segments will remain collapsed as the rollers 86 will be prevented from moving radially inwardly by cam faces 116. After the long segments are fully extended, the top shoulders 120 will bear against rollers 86 of bell cranks 64 to extend the short segments 54 thus to complete formation of the annular clamping ring 52.

With the ring segments 54 and 56 radially expanded, the clamping ring 52 may be urged by actuation of cylinder 82 into mating engagement with the toe ring 138 of the top mold section 42 to shape, compress and clamp the bead B of the tire T. As seen in FIG. 2, each ring segment is elongated radially to form a concavely curved bead contacting surface. Moreover, the rings have a conical machine register 134 for proper seating of the segments against the toe ring 138 which has a mating conical register 136.

Figure 5:
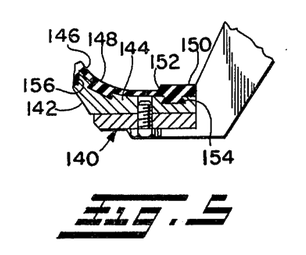
FIG. 5 is a fragmentary transverse section of an alternate construction of bead clamping ring employed with the chuck assembly.

In FIG. 5, a modified clamp ring assembly 140 is shown. The ring assembly 140 includes an arcuate, metal, radially extended clamp ring 142 having a concavely curved axial surface 144. A thin elastomeric facing 146 is molded integrally to the ring 142 to extend along the contour of the curved axial surface 144 and to provide a similarly curved bead contacting surface 148. The facing 146 further has an axially projected portion 150 at its radially inner end which forms at the radially outer edge thereof a conical register 152 for mating engagement with a corresponding register of the toe ring. The metal clamp ring preferably has dovetailed arcuate grooves 154 along its radially inner and outer edges for interlocking together the clamp ring and facing. Moreover, the facing preferably overlaps the radially outer edge of the clamp ring and may be received in a recess 156 in the radially outer edge of the ring.

Figure 3:
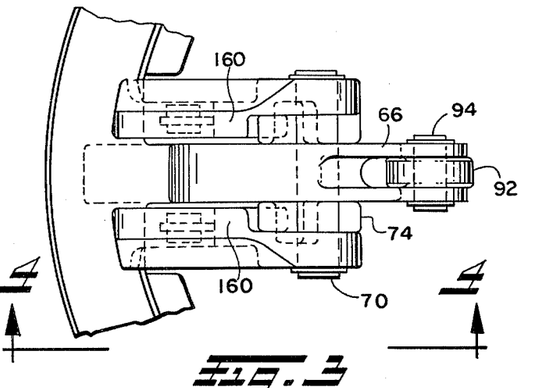
FIG. 3 is a fragmentary top plan of a modified chuck assembly employing bead centering shoes according to the invention.
Figure 4:
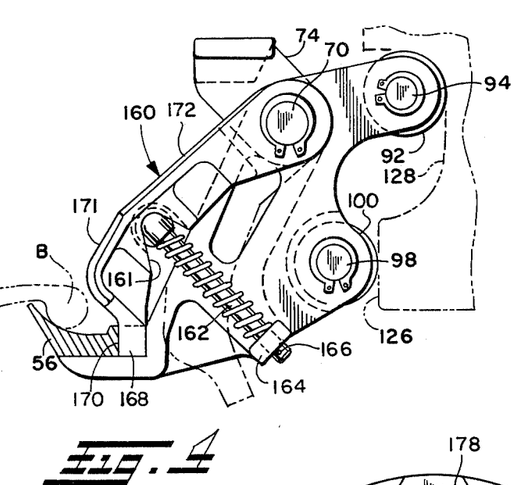
FIG. 4 is a vertical section of the assembly of FIG. 3 taken substantially along the line 4—4 thereof.
Figure 11:
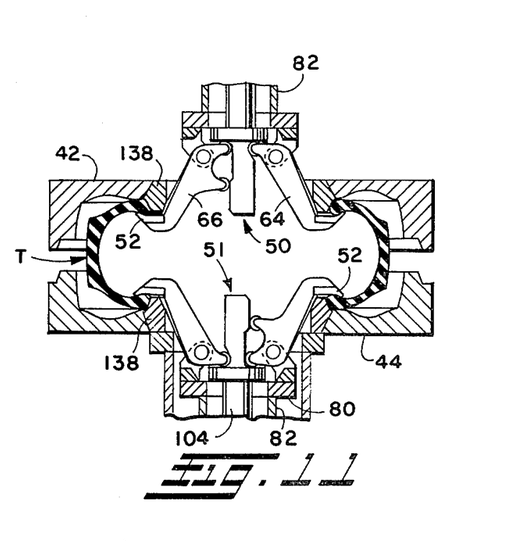

Referring now to FIGS. 3 and 4, the chuck assembly 50 preferably may be modified to include bead centering shoes 160. Each shoe 160 is mounted at its top or axially outer end for pivotal movement preferably about the bell crank pivot pin 70. Two such shoes 160 are provided outboard of the depending legs of the clevis 74 to ensure clearance with the modified bell crank 66. Each shoe 160 is formed at its underside with a notch 161 suitable to receive the head of a spring loaded rod 162 which biases the shoe to the solid line position of FIG. 4. The tail end of the spring rod 162 is secured to a strut 164 of the modified bell crank 66 and a pin 166 is employed to limit maximum extension thereof. Further, the maximum swing of the shoe is limited by a stop arm extension 168 at the distal end of the shoe which engages the radially inner axial surface 170 of the corresponding ring segment 56 at each side of bell crank 66. The outside contour 171 of the shoe when extended is inclined to the press axis and together the shoes when extended provide a gradually tapered conical guide surface having a maximum diameter proximate the inner diameter of the tire bead B to be centered, which guide surface centers the tire to the clamping ring as the chuck assembly moves axially vertically upwardly relative to the tire. That is, the inner bead of an off-center tire will engage the conical guide surface of the expanded shoes and will be urged to a centered position during loading of the press. A second cam surface 172 on the shoes may also be provided which cams against the top mold section to retract the shoes out of the way as the center mechanism is retracted axially upwardly into the upper mold section during closing of the press to its cure position. This is illustrated best in FIGS. 11–13.

Although the centering shoes are shown and described in connection with the long segments 56, the short segments may also be similarly provided with centering shoes if desired.

Figure 7:
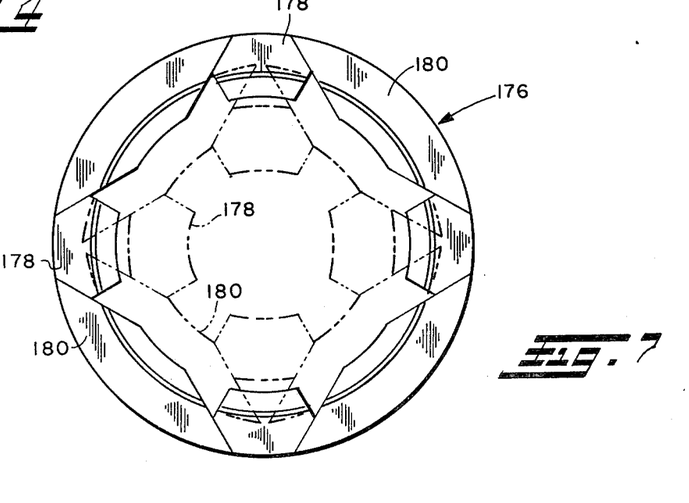
FIG. 7 is a schematic top plan illustrating an alternative arrangement of tire curing press chuck assembly employing a bead clamping ring consisting of eight ring segments.

While the annular clamp ring and chuck assembly 50 has been described above for a shaping and clamping ring consisting of six segments, it will be appreciated that the ring may be otherwise segmented. In FIG. 7, an annular clamping ring 176 is shown in which there are provided eight such segments forming the circular ring, e.g., four short segments 178 and four alternately arranged long segments 180. The clamping ring 176 is shown in solid lines in its expanded position with the tapered ends of the ring segments in juxtaposition. When collapsed to the phantom line position, the short segments 178 are swung through a greater arc than the long segments 180 and nest between adjacent tapered ends of the long segments.

Operation Of The Press

An operational sequence of the curing press 40 is seen in Figs. 8–19. As noted above, the press shown is of the straight up and down type; however, it will be appreciated that other types of presses can be similarly operated to obtain desired operational advantages.

In FIG. 8, the press 40 is shown fully opened and a green tire T held in a loading carrier or tray 190 is positioned between the top and bottom mold sections 42 and 44. Further, the top ring and chuck assembly 50, with the clamping ring 52 in its collapsed state, has been axially lowered or extended from the top mold section 42 with the bead clamping ring segments having been inserted into the tire to the position shown in phantom lines, and then having been swung to the solid line position or expanded state so that the shaping and clamping ring 52 underlies the top bead of the tire T. At this point, the bottom ring and chuck assembly 51 may have been axially extended with the ring segments 52 thereof in their collapsed state.

Figure 9:
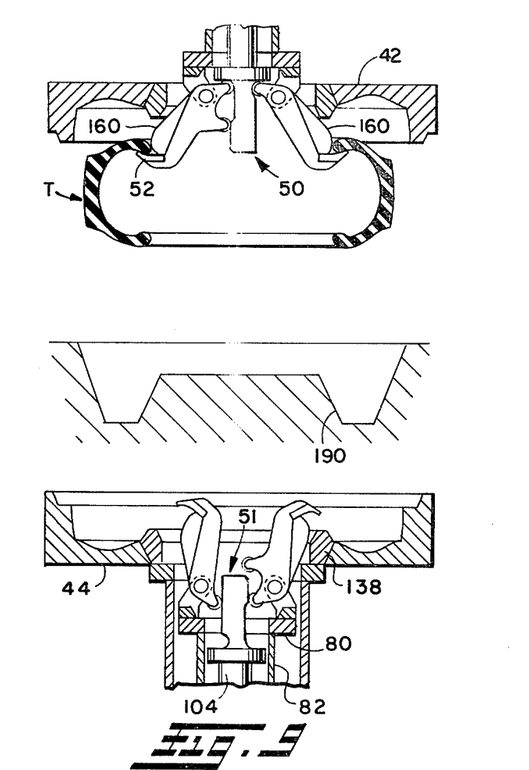

From such position, the top ring and chuck assembly 50 may now be raised or axially retracted into the top mold section 42 to provide sufficient clearance between the tire T and the carrier 190 so that the latter may be removed (FIG. 9). As the ring and chuck assembly 50 is retracted initially, the centering shoes 160 will cam the top bead of the tire to a centered position relative to the top clamping ring 52 and thus to the top mold section 42.

Figure 10:
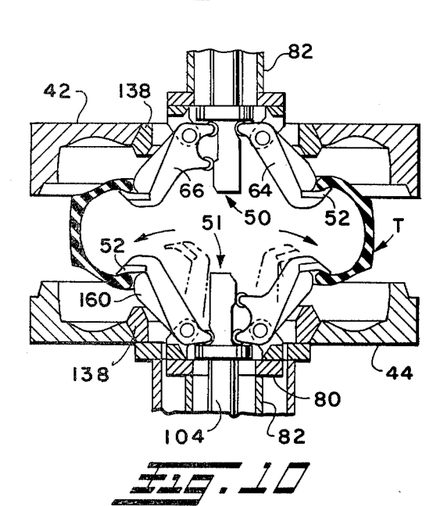

With the tire T centered to the top mold section 42, the press head may now begin to close moving both the top mold section 42 and top ring and chuck assembly 50 supporting the tire T towards the bottom mold section 44 so that the ring segments of bottom ring and chuck assembly 51 are inserted through the inner diameter of the bottom tire bead into the interior of the tire. When the tire is equidistant the mold sections, the bottom ring and chuck assembly 51 may then be actuated to move the collapsed ring segments thereof radially outwardly so that the bottom shaping and clamping ring 52 overlies the bottom bead of the tire T. The bottom ring and chuck assembly 51 is then lowered or axially retracted slightly whereby the centering shoes 160 thereof will engage the radially inner bead surface of the bottom bead to center same to the bottom ring 51 and thus the bottom mold section 44 (FIG. 10).

The press may now close to shaping height, and during such closing, the ring and chuck assemblies 50 and 51 are retracted simultaneously therewith into their respective mold sections to hold the tire centered to the mold sections as the latter come together and to contact the top and bottom beads of the tire simultaneously with their respective toe rings 138. The ring and chuck assemblies may then be retracted slightly further into their respective mold sections for low pressure clamp (FIG. 11) during which low pressure air may be introduced into the tire for initial shaping thereof. Because the clamping rings cause the tire beads to contact simultaneously their respective toe rings which normally are in a heated state, any resultant pre-cure of the beads will be the same thereby eliminating uneven bead cure heretofore found to occur with some presses. However, under low pressure clamp, only minimal cure will result in any event.

Figure 12:
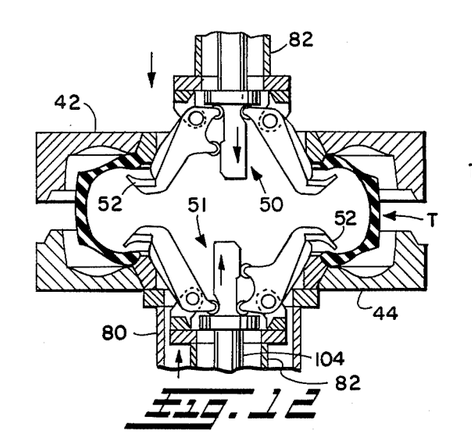
Figure 13:
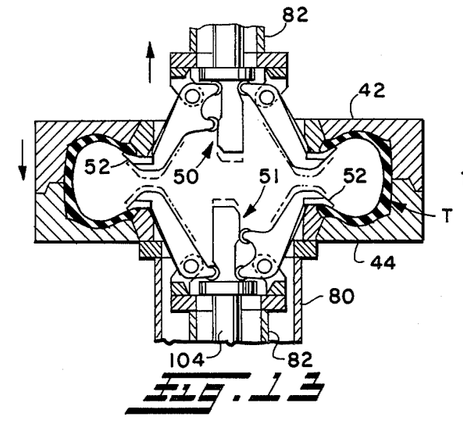

When low pressure shaping is complete, the ring and chuck assemblies may then move slightly towards each other to relax the clamp on the beads to allow the beads to rotate freely during final positioning and shaping of the tire (FIG. 12). Pressurized air then may be introduced into the tire as the press continues to close. When shaping pressure is obtained, the ring and chuck assemblies are then retracted simultaneously into their respective mold sections to provide simultaneous high pressure clamp to shape and firmly to hold the beads of the tire to their respective toe rings (FIG. 13). The clamping pressure on the bead rings can be varied to assure proper formation of the toe shape.

Thus it can be appreciated that as the press closely approaches its closed position, the center mechanism 48 causes simultaneously to register and seat the tire beads with the toe rings of the mold sections only at the desired point in the closing cycle. As a result, cure of both beads will begin simultaneously thereby eliminating uneven bead cure. Moreover, the beads will begin to cure only slightly before the rest of the tire as the same are seated only just before the press fully closes.

With the press fully closed, curing media then may be introduced into the tire T for curing of same. Early in the curing cycle, after the clamping rings 52 have formed the bead shape, the same may be moved slightly away from the beads by actuation of the chuck assemblies as shown in phantom lines in FIG. 13 if additional heat is required to cure the bead area. The clamping rings may also be grooved on their undersides to reduce the heat transfer path between cure media and bead.

Figure 14:
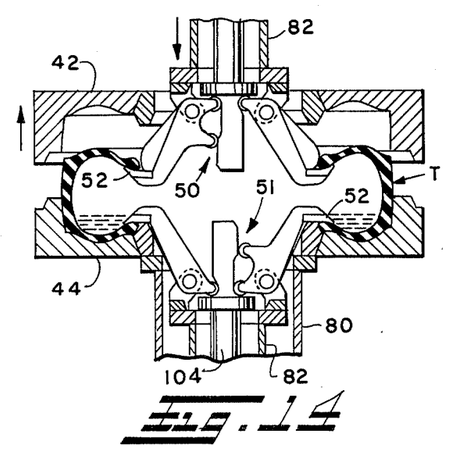
Figure 15:
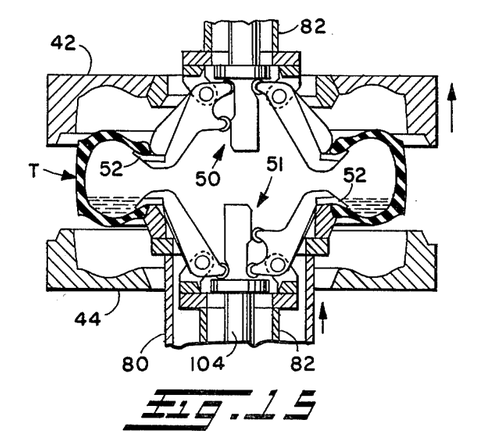

After sufficient cure time has elapsed, internal pressure is removed and the top ring and chuck assembly 50 may be powered downwardly as the top mold section simultaneously starts to open thereby to maintain the same spacing between the ring and chuck assemblies (FIG. 14). The lower tire bead remains clamped to its toe ring to retain the tire T in the bottom mold section 44 while the tire is first stripped from the top mold section 42. After the tire has been stripped from the top mold section 42, the top and bottom ring and chuck assemblies simultaneously may be raised together as the press continues to open to strip the tire from the bottom mold section 44 (FIG. 15).

Figure 16:
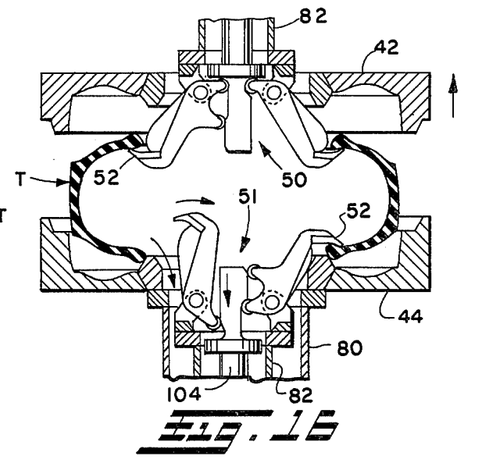
Figure 17:
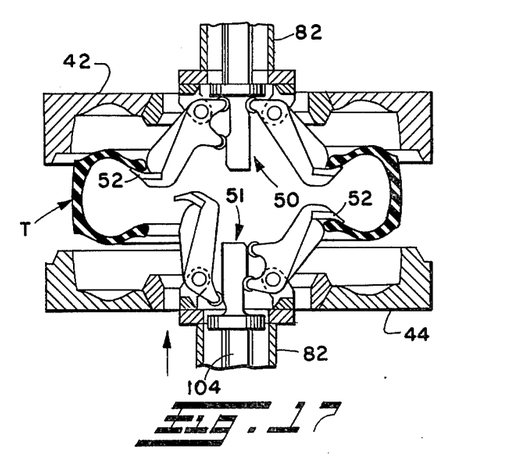

After the tire has been stripped from both mold sections press opening stops and the bottom ring and chuck assembly 51 may be lowered to distort or open the tire slightly so that the lower bead is at a lower elevation than the lower sidewall of the tire to permit any condensate retained therein to drain (FIG. 16). It will be appreciated that the bottom clamping ring 52 of the bottom ring and chuck assembly 51 has been partially collapsed with only the long ring segments 56 thereof holding the lower bead of the tire. Accordingly, condensate will drain through the gaps otherwise occupied by the retracted short segments 54 thereof.

Figure 18:
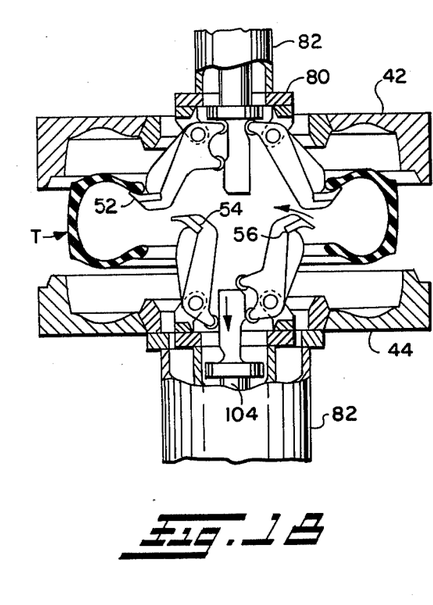
Figure 19:
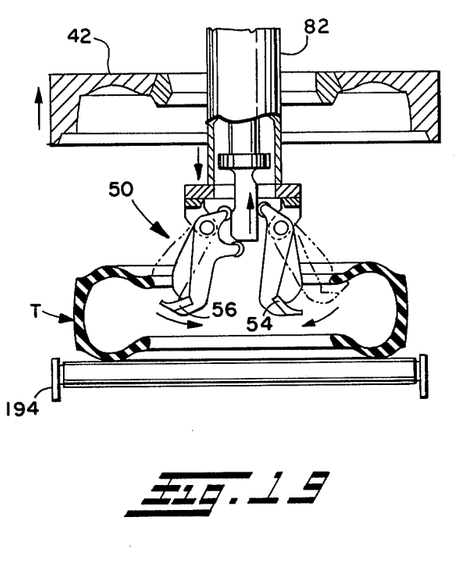

After the tire is completely drained, the bottom ring and chuck assembly 51 may be raised to restore the tire to its cured shape (FIG. 17) and then may be fully collapsed to clear the inner diameter of the bottom bead of the tire so that the tire will then be carried only by the top ring and chuck assembly 50 (FIG. 18). The top ring and chuck assembly and top mold section may then be raised and an unloading platform 194 positioned under the tire. The top ring and chuck assembly is then lowered to place the tire on the unloading platform (FIG. 19), and the ring 52 then is collapsed and the top ring and chuck assembly is retracted to clear the tire. The tire is now in position for removal from the press such as to a post cure inflator.

While the foregoing press operation is shown and described in connection with a press of the straight up and down type, the center mechanism 48 of the invention may be employed in combination with other types of presses such as those of the "slidefront" and "slideback" types. In the former, for example, the top ring and chuck assembly may pick up by the top bead a green tire positioned at a loading station forwardly of the press. Initially, the top bead of the tire will be centered to the movable top mold section and then brought to the position shown in FIG. 9 at which point the press cycle may continue in operation as above described. In a "slideback" type press, instead of loading a green tire, a cured tire may be removed from the press by the top ring and chuck assembly as the top mold section is translated rearwardly. Further, the top ring and chuck assembly will, if desired, positively control and precisely center the cured tire, for example, in a post cure inflator.

It should also be appreciated that the ring and chuck assemblies of the center mechanism may be used individually as well as paired in either bladder or bladderless curing to achieve automatic loading, centering and unloading of tires in the press.

Regardless of the type of press employed, vertical motion of the top mold section normally need only be enough to load and/or to remove the tire from the press. As a result, press head travel time is reduced with resultant reduction in time in which the press mold sections may cool. Accordingly, the duration of the open portion of the press operating cycle may be greatly foreshortened, thus conserving both time and energy.

With the present invention, it can now be seen that a tire press may be provided in combination with a center mechanism that is operative to center the beads of a green tire with respect to the mold sections of the press and then to hold the beads centered and axially separated as the press closes to cause the beads to register simultaneously with the rings of the top and bottom mold sections only at the desired point in the closing cycle. While accomplishing the desired bead clamping function, the center mechanism provides for automatic loading and unloading and centering of the tire press with the tire position being precisely maintained. Such tire press and center mechanism will lead to increased production and tire quality. Further, the ring and chuck assemblies of the center mechanism may be used individually or paired in bladder or bladderless curing to achieve automatic loading, centering and unloading.

Although the invention has been shown and described with respect to certain preferred embodiments, it is obvious that equivalent alterations and modifications will occur to others skilled in the art upon the reading and understanding of the specification. The present invention includes all such equivalent alterations and modifications and is limited only by the scope of the claims.

We claim:

1. In a tire press having relatively movable top and bottom mold sections, a center mechanism comprising a segmented annular ring for each mold section, means for engaging each ring with the axial interior of the respective bead of a green tire radially to center such bead to its respective mold section before the beads contact the mold sections and the press closes, and actuator means for collapsing the segments of said rings radially to clear the inner diameter of such beads.

2. The press of claim 1 wherein the mold sections include respective toe rings, and said segmented annular rings and means for engaging first center the top bead of the tire with respect to the top mold section and then the bottom bead with respect to the bottom mold section, and hold such beads centered and axially separated as the press closes to cause the beads to register with the toe rings of the top and bottom mold sections.

3. The press of claim 1 wherein said rings and means for engaging seat simultaneously the beads of the tire with the top and bottom mold sections before the press closes.

4. The press of claim 1 wherein said actuator means radially expands said segments to form said annular rings.

5. The press of claim 1 wherein said means for engaging includes means for moving each ring axially relative to their respective mold sections for shaping and clamping the beads of the tire to the mold sections.

6. The press of claim 5 wherein each ring includes centering means for centering precisely the respective bead of the tire on the ring thereof.

7. The press of claim 6 wherein said centering means includes a plurality of radially retractable pivoting shoes which together when radially extended define a conical guide surface for the tire bead.

8. The press of claim 7 wherein said centering means includes a retractable pivoting shoe for at least each alternate ring segment and said actuator means includes a bell crank for each ring segment, and said shoes and respective bell cranks have a common pivot.

9. The press of claim 8 wherein each shoe is biased radially outwardly and has a stop arm to engage an inner surface of its respective clamp ring to limit radial expansion of the shoe.

10. The press of claim 9 wherein said means for engaging includes an axially movable support for each ring and said bell crank for each segment is mounted for pivotal movement on said support.

11. The press of claim 10 wherein said shoes are cammed radially inwardly as said rings are axially retracted into their respective mold sections.

12. The press of claim 5 wherein said actuator means includes a multi-faceted linear cam assembly and respective followers for each ring segment to collapse each alternate segment and then each other segment.

13. The press of claim 12 wherein each cam follower comprises a pivoting bell crank having radially inner and outer arms, each segment secured to its respective bell crank at the latter's radially outer arm, and said radially inner arm of each bell crank is in operative engagement with a corresponding facet of said linear cam for effecting pivotal movement of said bell crank.

14. The press of claim 13 wherein said means for engaging includes an axially movable support for each ring, and each bell crank is mounted on its respective support for pivotal movement in a radially extending axial plane.

15. The press of claim 14 wherein each facet of said linear cam has a radially extending shoulder and said actuator means includes means to move said linear cam axially to engage said shoulders with said inner arm of each respective bell crank to effect pivotal movement thereof.

16. The press of claim 15 wherein each inner arm of each alternate bell crank engages its respective shoulder before each inner arm of each other segment upon axial movement of said cam in one direction.

17. The press of claim 16 wherein said linear cam includes second radially extending shoulders axially spaced from said first mentioned shoulders to engage said inner arm of each bell crank to effect pivotal movement thereof in a reverse direction upon axial movement of said cam in a direction opposite said one direction thereby to radially expand said segments to form said rings.

18. The press of claim 17 wherein said bell crank corresponding to each alternate segment includes a second radially inwardly extending arm operative to maintain each other segment radially expanded during initial axial movement of said cam in said one direction so that each alternate segment is collapsed before each other segment.

19. The press of claim 14 wherein said linear cam is movable axially and each alternate facet forms a cam face having a slot therein forming opposed shoulders, and each bell crank corresponding thereto has said radially inwardly extending arm thereof to engage one shoulder to pivot the crank upon axial movement of the cam in one direction and the other shoulder reversely to pivot the crank upon movement of the cam in a direction opposite said one direction.

20. The press of claim 19 wherein each other alternate facet forms a cam face terminating at its axial ends in radially inwardly extending shoulders, and each bell crank corresponding thereto has first and second radially inwardly extending arms, one arm to engage one of said shoulders to pivot the bell crank upon axial movement of the cam in said one direction and the other arm to engage the other shoulder reversely to pivot the crank upon movement of the cam in said direction opposite said one direction.

21. The press of claim 12 wherein said linear cam is movable axially and has a plurality of cam faces each facing in a different radial direction.

22. The press of claim 21 wherein each follower comprises a pivoting bell crank in radial alignment with a respective cam face of said linear cam.

23. The press of claim 22 wherein each bell crank has radially inner and outer arms, the former being in operative engagement with its respective cam face and the latter secured to its respective segment.

24. The press of claim 23 wherein each alternate cam face is radially recessed to define opposed first and second shoulders, and each alternate bell crank aligned with each alternate cam face has a radially inwardly extending arm alternately to engage said opposed shoulders upon axial movement of said cam in opposite directions for pivotal movement of each alternate bell crank for expanding and contracting said rings.

25. The press of claim 24 wherein each other alternate cam face is radially inwardly recessed at its axial ends to define third and fourth radially inwardly extending shoulders, and each other bell crank aligned with each other cam face includes a pair of radially inwardly extending arms alternately and respectively to engage said third and fourth shoulders upon axial movement of said cam in opposite directions for pivotal movement of each other bell crank.

26. The press of claim 14 wherein each alternate bell crank pivots through a greater arc than each other bell crank.

27. The press of claim 26 wherein each alternate bell crank begins to pivot before each other bell crank upon axial movement of said cam in one direction and each other bell crank begins to pivot before each other bell crank upon axial movement of said cam in the direction opposite said one direction.

28. The press of claim 12 wherein said linear cam comprises an axially movable rod having an outer profile of polygonal shape presenting a plurality of faces each facing in a different radial direction, and respective radially extending cam blocks secured to each face, each cam block having a radially outer cam face.

29. A tire engaging apparatus comprising segmented annular ring means for engaging the axial interior of the bead area of a tire, said segmented annular ring means including a plurality of ring segments arranged in two sets of alternating segments, and actuator means for expanding and collapsing the segments of the ring radially to clear the inner diameter of the tire bead, said actuator means including axially movable multifaceted linear cam means and respective radially movable followers for each segment of said segmented annular ring means for collapsing under positive control one set of alternating segments while holding the other set radially extended and then collapsing under positive control the other set of segments, and vice versa for expansion of said segments.

30. The apparatus of claim 29 wherein said linear cam means has a plurality of cam faces each facing in a different radial direction.

31. The apparatus of claim 30 wherein each follower includes a pivoting bell crank in radial alignment with a respective cam face of said linear cam means.

32. The apparatus of claim 31 wherein each bell crank has radially inner and outer arms, the former in operative engagement with its respective cam face and the latter secured to its respective segment.

33. The apparatus of claim 32 wherein each alternate cam face is radially recessed to define opposed first and second shoulders, and each alternate bell crank aligned with each alternate cam face has a radially inwardly extending arm, alternately, to engage said opposed shoulders upon axial movement of said cam means in opposite directions for pivotal movement of each alternate bell crank.

34. The apparatus of claim 33 wherein each other alternate cam face is radially inwardly recessed at its axial ends to define third and fourth radially inwardly extending shoulders, and each other bell crank aligned with each other cam face includes a pair of radially inwardly extending arms alternately and respectively to engage said third and fourth shoulders upon axial movement of said cam in opposite directions for pivotal movement of each other bell crank in opposite directions.

35. The apparatus of claim 29 wherein said actuator means includes an axially movable rod having an outer profile of polygonal shape presenting a plurality of faces each facing in a different radial direction, and said linear cam means includes respective radially extending cam blocks secured to each face, each cam block having a radially outer cam face.

36. The apparatus of claim 35 wherein each alternate bell crank pivots through a greater arc than each other bell crank.

37. In a tire curing press having relatively movable top and bottom mold sections, a center mechanism comprising top means and bottom means respectively for first engaging and centering the top bead of a green tire with respect to the top mold section and then for engaging and centering the bottom bead with respect to the bottom mold section, and then together for holding such beads centered and axially separated as the press closes to cause the beads to register with the top and bottom mold sections.

38. In a tire press as set forth in claim 37 wherein said mold sections include respective toe rings, and said center mechanism includes means axially to move said top means and bottom means to seat the beads on the toe rings of the top and bottom mold sections shortly before the press closes.

39. In a tire curing press having relatively movable top and bottom mold sections, segmented annular clamp ring means for engaging the axial interior of a bead area of a tire, and bead centering means for centering precisely a tire on said annular clamp ring means during loading of the tire into the press, said bead centering means being radially retractable with respect to said clamp ring means as the press closes.

40. The press of claim 39 wherein said ring means includes a plurality of segments and said bead centering means include a pivoting shoe for at least each alternate segment and means to bias each shoe radially outwardly to define an inclined surface for each such shoe which define a conical guide surface for the tire bead.

41. The press of claim 41 comprising a bell crank for each segment, and said shoe and bell crank for each segment have a common pivot.

42. The press of claim 41 wherein each shoe has a stop arm to engage a radially inner surface of its respective ring segment to limit radial expansion of the shoe.

43. The press of claim 42 comprising an axially movable support for said ring means, and a bell crank for each segment mounted for pivotal movement on said support.

44. The press of claim 43 comprising means to move said support axially to retract said ring means into one of the mold sections, and wherein said shoes are cammed radially inwardly as said ring means is retracted into such one of the mold sections.

45. A tire press comprising top and bottom mold sections, a loader in and concentric with said top mold section, said loader including radially expandible and collapsible bead engaging members, means in said press to elevate and lower said loader, means in said press to collapse said members to permit insertion of same into a green tire and to expand said members to a diameter sufficient to engage the inside of the top bead of the tire when the press is open and the loader is elevated, and means in said loader to center the top bead of the tire on said members when expanded and thus to said top mold section when the loader is elevated, said means to center being radially retractable relative to said members as said press closes.

46. The press of claim 45 wherein said members are segments of a segmented annular ring.

47. The press of claim 45 wherein said loader includes a support of said members and said means to center includes a plurality of radially retractable pivoting shoes mounted on said support which together when radially extended define a conical guide surface for the tire bead.

48. The press of claim 47 wherein each shoe is biased radially outwardly.

49. The press of claim 48 wherein said means to elevate and lower includes means to retract said loader into said top mold section as said press closes.

50. The press of claim 49 wherein said top mold section includes means to cam said shoes radially inwardly as said loader is retracted into said top mold section.

* * * * *